Oct. 31, 1967    L. C. PURSIANO ETAL    3,350,709
ELECTROMAGNETIC INDICATOR DEVICE WITH MAGNETIC
LOCKING MEANS
Filed July 7, 1964    3 Sheets-Sheet 1

INVENTORS
LEONARD C. PURSIANO
ARNOLD H. COHEN
GEORGE O. RANES
BY Herbert L. Davis
ATTORNEY

INVENTORS
LEONARD C. PURSIANO
ARNOLD H. COHEN
GEORGE O. RANES

ATTORNEY

NUMBER CALL OUT

| SWITCH No. | + ON | − ON |
|---|---|---|
| 1 | A | X |
| 2 | X | D |
| 3 | B | X |
| 4 | X | E |
| 5 | C | X |
| 6 | X | A |
| 7 | D | X |
| 8 | X | B |
| 9 | E | X |
| 0 | X | C |

TABLE A

NUMBER CALL OUT

| LEAD X | POLES | | | | | No. |
|---|---|---|---|---|---|---|
| | E | D | C | B | A | |
| − | | | | + | + | 1 |
| − | | | | + | | 2 |
| − | | | + | + | | 3 |
| − | | | + | | | 4 |
| − | | + | + | | | 5 |
| − | | + | | | | 6 |
| − | + | + | | | | 7 |
| − | + | | | | | 8 |
| − | + | | | | + | 9 |
| − | | | | | + | 0 |

TABLE B

FIG. 5

United States Patent Office 3,350,709
Patented Oct. 31, 1967

3,350,709
ELECTROMAGNETIC INDICATOR DEVICE WITH MAGNETIC LOCKING MEANS
Leonard C. Pursiano, Ridgewood, and Arnold H. Cohen, Park Ridge, N.J., and George O. Ranes, Rolla, Mo., assignors to The Bendix Corporation, Teterboro, N.J., a corporation of Delaware
Filed July 7, 1964, Ser. No. 380,899
6 Claims. (Cl. 340—378)

This invention relates to an electromagnetic indicator device and more particularly to improvements in an electromagnetic indicator of a type such as disclosed in U.S. Patent No. 3,089,131, granted May 7, 1963, to William H. Morgan and assigned to The Bendix Corporation, and in U.S. Patent No. 3,109,167, granted Oct. 29, 1963, to John R. MacIntyre and Raymond J. Miller, and to an electrically actuated indicator for adjustably positioning any one of a plurality of discrete numbers or symbols on a single rotating drum so as to indicate, for example, any one of ten decimal digits 0–9, inclusive, and by electrical impulses selectively applied through six wires by either a direct positive to negative connection, negative to positive connection, or a selectively effected one or two connection of the controlling electromagnets.

An object of the invention is to provide an electromagnetic indicator embodying a five-pole electromagnetic assembly including a two-pole permanent magnet rotatably mounted in cooperative relation therewith and so arranged in relation to the five-pole electromagnetic assembly as to eliminate discrepancies in selectively positioning in relation to a viewing window numbers or indicating symbols borne by a rotatable indicator drum driven by the permanent magnet, in that the permanent magnet is so poled that one pole is magnetized in line with a center line while an opposite pole of the permanent magnet is arcuately displaced fifteen degrees (15°) from the center line so as to prevent ambiguity in the selective positioning of the numbers or indicating symbols borne by the drum.

Another object of the invention is to provide a magnetic indicator having a permanent magnet with opposite poles out of alignment one with the other so that the permanent magnet may be operably positioned from one adjusted position to a diametrically opposite adjusted position relative to the five-pole electromagnetic assembly by magnetic forces applied thereby to the out of line poles of the permanent magnet without danger of stalling of the permanent magnet in a dead center position.

Another object of the invention is to provide an improved simplified electromagnetic indicating apparatus including an improved magnetic rotor member having out of line poles so arranged as to provide a plurality of discrete angularly spaced rotor positions without the need of auxiliary pole pieces or magnetic lock members such as shown in the aforenoted patents to prevent ambiguity in effecting the displacement of the rotor.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figure 3:
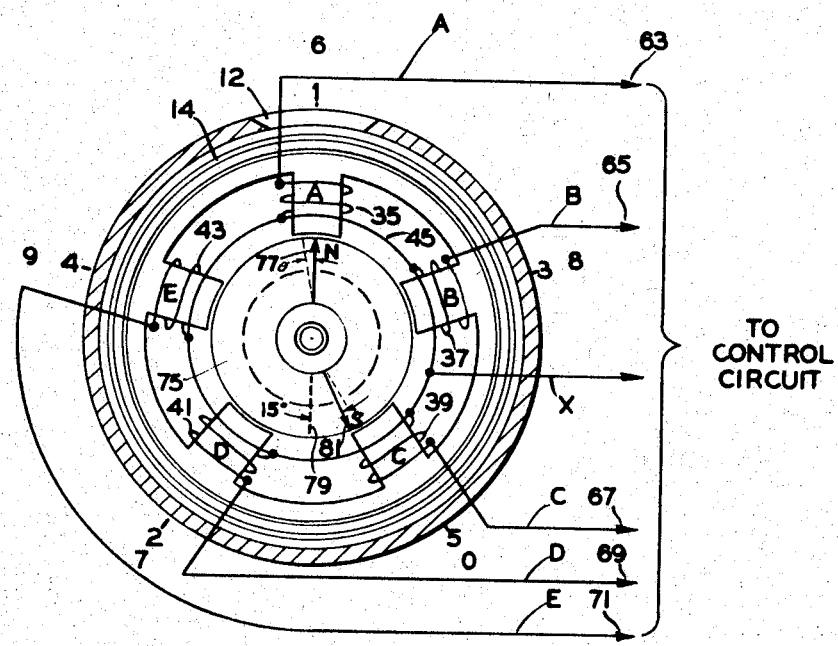
FIGURE 3 is a schematic wiring diagram of the indicator of FIGURE 2 illustrating the circuit arrangement for energizing the indicator.

FIGURE 5 illustrates Tables A and B in which Table A shows the mode of energization of the controlling electromagnets of the indicator of FIGURE 3 to produce different indications by the provisions of either a + to − connection or a − to + connection while Table B shows a somewhat different mode of energization of the electromagnets using common polarity excitation and one or two connection of the controlling electromagnets.

Figure 2:
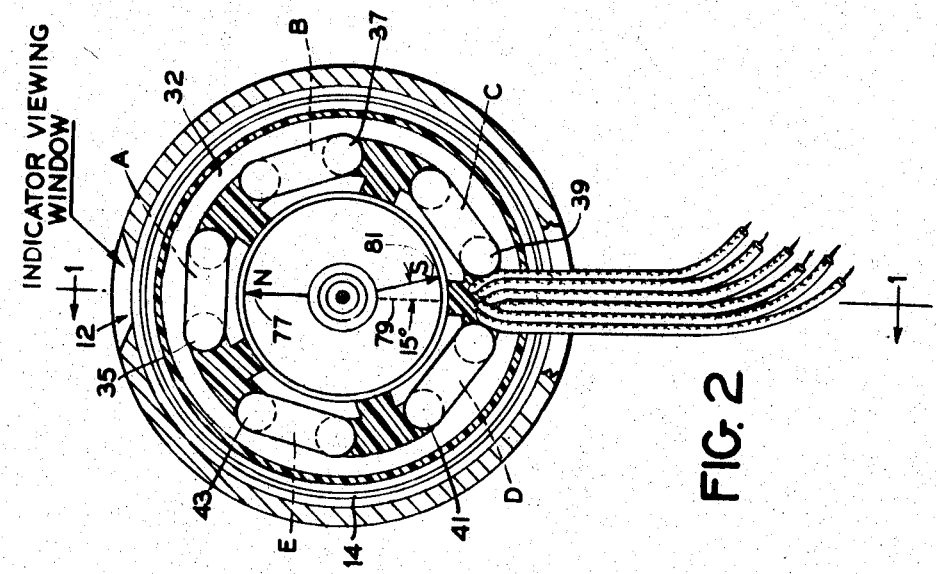
FIGURE 2 is a sectional view of FIGURE 1 taken along the lines 2—2 of FIGURE 1 and looking in the direction of the arrows.
Figure 1:
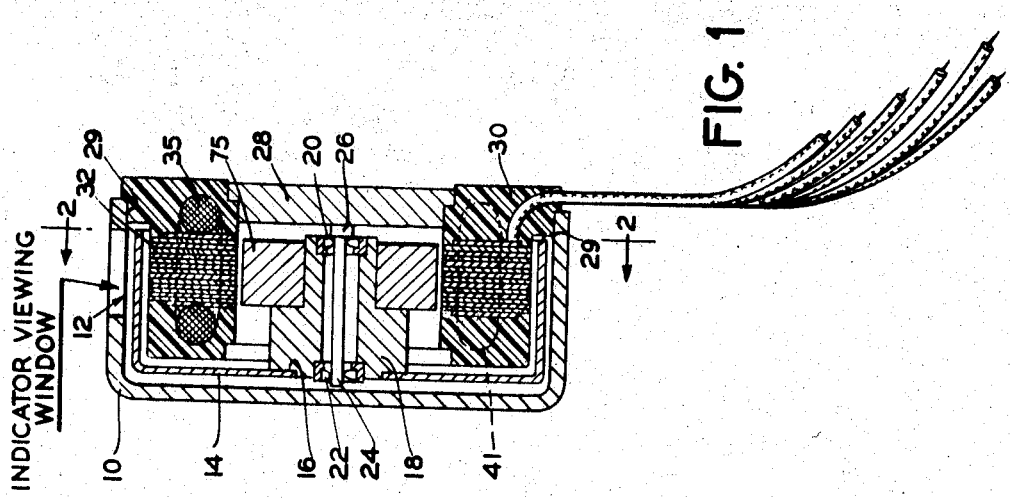
FIGURE 1 is a cross-sectional view of an indicator embodying the invention and taken along the lines 1—1 of FIGURE 2 and looking in the direction of the arrows.

Referring to the drawings of FIGURES 1, 2, and 3, an indicator constructed in accordance with the invention is shown as including a casing 10 of a generally cylindrical configuration including a window 12 in the side wall thereof through which any one of a plurality of numbers or indicator symbols may be viewed on a rotary indicating member or drum 14.

The drum 14 is formed of a light weight nonmagnetic material such as aluminum which is centrally secured at 16 to a mounting sleeve 18 carried by jewel or other suitable bearings 20 and 22 mounted at opposite ends of the sleeve 18 and rotatably supporting the sleeve 18 on a shaft 24 which is secured at one end 26 to an end cap 28 fixedly mounted in a plastic electrical insulating block 30 which is in turn affixed to the casing 10 at an annular flange 29. The plastic electrical insulating material or block 30 may be of a suitable epoxy material and serves to encapsulate within the casing 10 a five-pole stator indicated generally in the drawing of FIGURE 1 by the numeral 32.

Projecting radially inward from the stator 32 are the poles A, B, C, D, and E, shown in FIGURES 2 and 3, and further wound about the respective poles A, B, C, D, and E are electromagnetic coils 35, 37, 39, 41, and 43, shown structurally in FIGURE 2 and diagrammatically in FIGURE 3.

Figure 4:
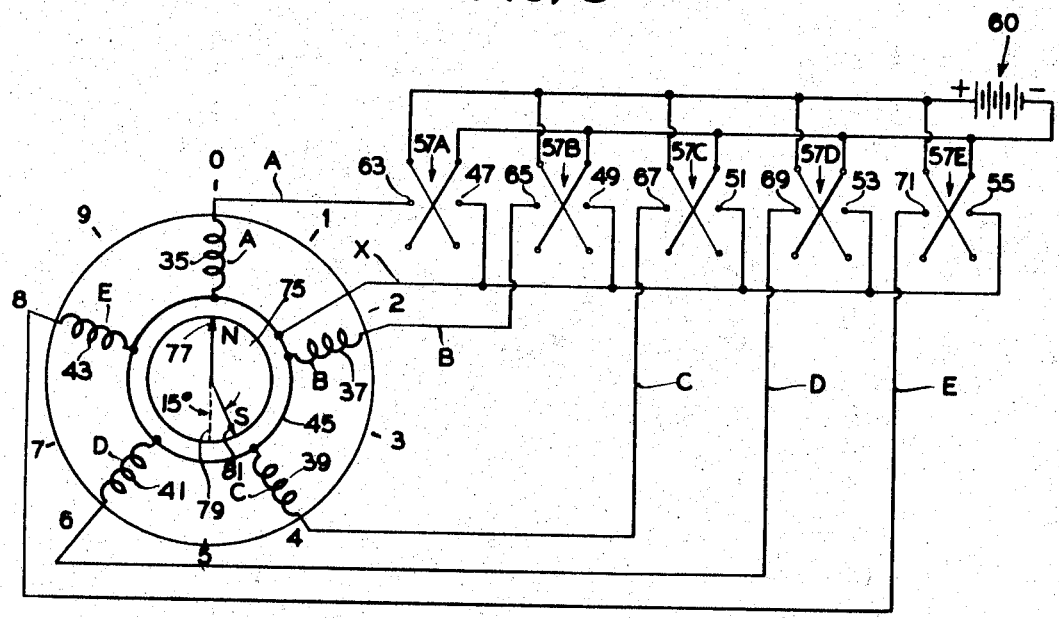
FIGURE 4 is a circuit diagram showing the switching arrangement which may be utilized to energize the controlling electromagnets of the indicator.

As shown schematically in FIGURE 3, the inner ends of each of the coils 35, 37, 39, 41, and 43 are connected to a common conductor 45 connected by a conductor X to switch contacts 47, 49, 51, 53, and 55 arranged for cooperation with two-way control switches 57A, 57B, 57C, 57D, and 57E for the electromagnetic control coils 35, 37, 39, 41, and 43 of the poles A, B, C, D, and E, as shown diagrammatically in FIGURE 4, and arranged to selectively connect the positive and negative terminals of the source of electrical energy 60 to the switch contacts 47, 49, 51, 53, and 55 leading to the inner ends of the electromagnetic coils 35, 37, 39, 41, and 43.

The outer terminals of the electromagnetic coils 35, 37, 39, 41, and 43 wound about the respective poles A, B, C, D, and E are connected, respectively, to switch contacts 63, 65, 67, 69, and 71 which are also arranged to cooperate with the selectively operable switch arms 57A, 57B, 57C, 57D, and 57E so that the outer terminals of the electromagnets 35, 37, 39, 41, and 43 may be selectively connected to the positive or negative terminals of the source of electrical energy 60 to effect the desired controlling action, as hereinafter explained.

In this connection, it should be noted that the five poles A, B, C, D, and E are equally angularly spaced about a circular rotatable permanent magnet 75 having opposed poles 77 and 81 cooperatively arranged in relation to the electromagnet poles A, B, C, D, and E. The rotatable permanent magnet 75 is secured to the bearing sleeve 18, as shown in FIGURE 1, and the magnet 75 is so arranged that one pole 77, for example, the north pole, is magnetized in line with a center line 79 while the opposing pole 81, or south pole, is magnetized 15° out of line with the center line 79, as indicated in FIGURES 2, 3, and 4.

The arrangement is such then that by the selective operation of the switch arms 57A, 57B, 57C, 57D, or 57E by the operator, as indicated in the Table A of FIGURE 5, a direct positive to negative connection or a direct negative to position connection of the source of electrical energy 60 to the selected magnet windings on the poles A, B, C, D, or E may be effected to call out the indicator number or symbol on the drum 14, as shown at Table A of FIGURE 5 by the electromagnetic positioning of the drum 14 in relation to the indicator viewing window 12, shown in FIGURES 1 and 3.

In an alternative mode of operation, a one or two connection of the controlling electromagnetic windings 35, 37, 39, 41, and 43 of the poles A, B, C, D, and E, as indicated in Table B of FIGURE 5 by the indicated positive (+) designation may be effected to provide the desired indication operation of the electromagnets. The common polarity excitation of one or two coils may be all negative if required with the common lead positive.

A feature of the invention is the novel arrangement of the circular rotatable permanent magnet 75 with the opposing north and south poles 77 and 81 out of alignment one with the other so that the drum 14 affixed thereto through the mounting sleeve 18 may be angularly positioned to all points without ambiguity in the operation thereof which might otherwise be the case if the opposing poles 77 and 81 of the permanent magnet 75 be arranged in alignment one with the other.

OPERATION

In the operation of the aforedescribed indicator, it will be seen that the shaft 24 is affixed to the end cap 28 and is stationary. On the other, the rotating assembly of the off center permanent magnet 75, sleeve 18, and indicator drum 14 carried thereby is free to turn about the fixed shaft 24 on jeweled or other suitable bearings 20 and 22.

The unit is caused to function by placing a D.C. voltage on any of the terminals of the coils wound on the poles A, B, C, D, and E or combination of coils, as shown in Tables A and B. Any indicator number or symbol may be thus called out by the operator-operative manipulation of the selective switches 57A, 57B, 57C, 57D, and 57E, as shown in Table A of FIGURE 5. Thus, as shown in Table A of FIGURE 5, as soon as the coil 35 on pole A is energized a magnetic field is set up by the coil 35 on pole A causing the poles of permanent magnet rotor 75 to line up with the field of the pole A causing a number on the drum 14 to appear adjacent the cover window 12.

Thus, for example, if an indicator number 1 on the drum 14 is called out by the connection of the positive terminal of the source of electrical energy 60 to the outer terminal of the coil 35 on the pole A and the inner terminal of the coil 35 to the negative terminal of the source 60, the number 6 may be called out by reversing the connections and connecting the inner terminal of the coil 35 to the positive terminal of the battery 60 and the outer terminal of the coil 35 to the negative terminal of the source of electrical energy 60.

If the poles of the magnet 75 are arranged in aligned relationship, as in the conventional permanent magnet, the reversal of the polarity of the electromagnet A would fail to effect the desired reversal of the adjusted position of the rotatable magnet 75, since the magnetic turning force would be equal in either direction and hence no movement of the rotatable magnet 75 would be effected.

However, in the novel arrangement herein presented, the poles 77 and 81 of the rotatable magnet are arranged in an out of line relationship, for example, 15° so that the desired adjustment of the magnet and thus of the drum 14 may be effected to provide the desired indication upon reversal of the polarity of the controlling coil without any undesirable ambiguity in the operation thereof.

In the mode of operation shown in the Table B of FIGURE 5, it will be seen that if a single pulse is placed on the coil 35 of the pole A by applying a + D.C. to the outer terminal of the coil A, the unit will operate the same, as shown in Table A. However, if the outer coil terminals of both coils A and B are energized together from the positive terminal of the source 60 and the inner terminals are connected through the common line X to the negative terminal of the source of electrical energy 60, a number will appear advanced 36°.

For example, if the number 0 is called out by the positive terminal of the source of electrical energy 60 being connected to the outer terminal of the coil 35 on the pole A and the negative terminal of the source of electrical energy 60 being connected through the common conductor X to the inner terminal of the coil 35, it will be seen that an indicator number 1 on the drum 14 may be called out by the connection of the positive terminal of the source of electrical energy 60 to the outer terminals of the coils 35 and 37 on the poles A and B with the negative terminal of the source 60 being connected to the inner terminal of the coils 35 and 37. The other indicator numerals on the drum 14 may be similarly called out by the selective operation of the switches 57A, 57B, 57C, 57D, and 57E, as shown in the Table B of FIGURE 5. It should be borne in mind that the negative terminal of the source of electrical energy 60 will be connected at all times through the common conductor X to the inner terminal of the several electromagnetic coils 35, 37, 39, 41, and 43 wound on the poles A, B, C, D, and E, while the positive terminal of the source 60 will be selectively connected to the outer terminal of the windings 35, 37, 39, 41, and 43 on the poles A, B, C, D, and E, as indicated by the positive signs (+) on Table B of FIGURE 5. The common polarity excitation of one or two coils may be all negative if required with the common lead positive.

It will be further noted that, upon deenergization of the selected coil on the poles A, B, C, D, or E, as indicated on the Tables A and B of FIGURE 5, the rotor 75, as shown in FIGURE 3, by the dotted lines will move through a small angle indicated as "$\theta$" in FIGURE 3, which angle is determined by the positioning and hence the combined effects of the off-line poles 77–81 of the permanent magnet 75 in cooperation with the magnet cores of the poles A, B, C, D, and E, as the case may be. The numerals or indicator symbols indicated on the drum 14 are so positioned on the drum 14 as to become effective for viewing through the window 12 upon energization of the controlling coil.

It will be further noted that the novel arrangement of the off-line poles 77 and 81 of the permanent magnet 75 will effect the desired operation of the magnet 75 and thus the drum 14 without the need of electromagnetic locking members or auxiliary pole pieces which have heretofore been found necessary to prevent ambiguity in operation of rotatable permanent magnets, as heretofore explained in the aforementioned patents.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In an electromagnetic indicating apparatus for displaying a plurality of discrete indicia in response to electrical energization, said indicating apparatus being of a type including a permanent magnet rotor supported for deflection about an axis thereof relative to a plurality of N discrete angularly spaced positions, a plurality of N/2 electromagnetic coils, and the coils being positioned about said rotor axis and around magnetic cores extending radially in a direction substantially perpendicular to said rotor axis, the improvement comprising:

said permanent magnet rotor having opposed poles extending arcuately at an angle of less than one hundred-eighty degrees relative one to the other;

means for effecting selective energization of said coils with electrical signals of either of two opposed polarities to cause angular movement of said magnet rotor about the axis thereof from a first of the angularly spaced positions to a second of said positions; and one of the poles of said magnet being positioned in an angular cooperative relation to one of the magnetic cores for causing in response to deenergization of one of said coils an angular movement of said magnetic rotor about the axis thereof towards said one core and into a third of said angularly spaced positions adjacent the second position for magnetically locking the rotor, and said angular movement being in a direction and sense predetermined by the arcuate extension of the poles in the angular relation of the one to the other of less than one hundred-eighty degrees.

2. In an electromagnetic indicating apparatus for displaying a plurality of discrete indicia in response to electrical energization, said indicating apparatus being of a type including a permanent magnet rotor supported for deflection about an axis thereof relative to a plurality of N discrete angular spaced positions, a plurality of N/2 electromagnetic coils, the coils being positioned about said rotor axis and around magnetic cores extending radially in a direction substantially perpendicular to the rotor axis, the improvement comprising:

said permanent magnet rotor having opposed poles extending arcuately at an angle of less than one hundred and eighty degrees relative one to the other;

means for selectively energizing said coils with electrical signals of two opposed polarities, said permanent magnet rotor being deflected to a first of said angularly spaced positions in accordance with the position of the energized coil and the polarity of energization; and said permanent magnet being deflected in an angular direction and to a second of said angularly spaced positions for magnetically locking said permanent magnet rotor in response to deenergization of said selectively energized coil, and said second position being dependent upon the angular relation of the opposed poles of the permanent magnet rotor to adjacent magnetic cores.

3. In an electromagnetic indicating apparatus for displaying a plurality of N discrete indicia in response to electrical energization, said indicating apparatus being of a type including a permanent magnet rotor having north and south poles and rotatably supported for deflection about the axis thereof to a plurality of N discrete angularly spaced positions, a plurality of N/2 electromagnetic coils, the coils being positioned about said rotor axis and around magnetic cores extending radially in a direction substantially perpendicular to the axis of said rotor, and means for selectively energizing said coils, the combination comprising:

said magnetic rotor having north and south poles extending in an angular relation of less than one hundred and eighty degrees relative one to the other;

said magnetic rotor being deflected to a first of said angularly spaced positions in response to the selective energization of the electromagnetic coils and the polarity of such energization; and said magnetic rotor being deflected to a second of said angularly spaced positions in response to the deenergization of said coils for magnetically locking said rotor, and said second position being adjacent said first position and dependent upon the angular position of the poles of the permanent magnet rotor in relation to the cores of the electromagnetic coils and causing a magnetic lock upon said rotor.

4. In an electromagnetic indicating apparatus for displaying ten discrete indicia in response to electrical energization, said apparatus being of a type including a casing having a viewing aperture therethrough, a rotary indicating member positioned within said casing and movable on an axis of rotation through ten discrete positions to display any of said ten different indicia through said window, a rotatable permanent magnet drivingly connected to said rotary member and having north and south poles, five electromagnetic coils positioned about said rotary member and around magnetic cores extending radially in a direction substantially perpendicular to the axis of said rotary member, and selectively operable switching means to selectively energize said electromagnetic coils, the improvement comprising:

the north and south poles of said permanent magnet extending arcuately fifteen degrees out of alignment one with the other so that said permanent magnet may rest in one off-center position of said discrete positions with respect to the magnetic forces produced by the selective energization of the electromagnetic coils; and the permanent magnet being responsive to deenergization of the electromagnetic coils to be angularly deflected in response to the magnetic force of the permanent magnet about the axis of rotation thereof to another position of said discrete positions adjacent the first position for magnetically locking the rotor.

5. In an electromagnetic indicator of a type for displaying a plurality of N discrete indicia in response to electrical energization, a stator having an annular ferromagnetic core for establishing any one of a plurality of N discretely oriented magnetic fields, the core having a plurality of substantially equally angularly spaced N/2 radial poles protruding inwardly equal distances, a plurality of windings, each winding being mounted upon a different radial pole and being arranged to be separately energized by an electrical signal, and a rotor being mounted to rotate within the enclosure of the annular core about a pivotal axis at a geometric center of the core, the improvement comprising:

the rotor including a circular permanent magnet rotatably mounted in concentric relation to the pivotal axis at a geometric center of the core;

the circular magnet having a circumferential edge providing a radial gap of equal distance between said circumferential edge and inner ends of the radial poles of said annular ferromagnetic core;

the circular magnet having two poles of opposite magnetic polarity whereby said circular magnet rotates about said pivotal axis upon the separate energization of one of said stator windings and into a first position in substantial alignment with one of said discretely oriented magnetic fields established by the energized stator winding, the two poles of the circular permanent magnet being in cooperative arrangement with the radial poles of the ferromagnetic core for causing a magnetic lock arrangement in which one of the poles of the circular magnet is offset from a straight line passing through said pivotal axis and the other pole of said circular magnet; and the radial poles being so spaced about the annular core that one of the poles of the circular magnet is aligned with one radial pole in response to the energization of the corresponding stator winding, the other pole of the circular magnet being positioned in such an offset relation adjacent to another of said radial poles and responsive to the de-energization of all of said stator windings for deflecting said circular permanent magnet toward said other radial pole from said first position under the magnetic force of the permanent magnet in an angular sense to a second position adjacent the first position and dependent upon the angular relation of the poles of the circular permanent magnet to the inner ends of said one and other radial poles of said annular ferromagnetic core, and said second position causing upon said permanent magnet the magnetic lock arrangement.

6. In an electromagnetic indicator of a type for displaying a plurality of discrete indicia in response to electrical energization, a stator having an annular ferromagnetic core for establishing any one of a plurality of N discretely oriented magnetic fields, the core having a plurality of substantially equally angularly spaced N/2 radial poles protruding inwardly equal distances, a plurality of windings, each winding being mounted upon a different radial pole and being arranged to be separately energized by an electrical signal, a rotor having a magnet mounted to rotate within the enclosure of the annular core about a pivotal axis at a geometric center of the core, and the magnet having two poles of opposite magnetic polarity whereby the magnet rotates about said pivotal axis upon the separate energization of one of said stator windings into a position in substantial alignment with the magnetic field established by the stator, the improvement comprising:

the two poles of the magnet providing in cooperation with the radial poles of the ferromagnetic core a magnetic lock arrangement in which one of the poles of the magnet is offset from a straight line passing through the pivotal axis and the other pole of the magnet;

the radial poles being spaced about the annular core so that when one of the poles of the magnet is aligned with one radial pole in a first angular position in response to the energization of the winding mounted on said one radial pole, the other pole of the magnet being positioned in an offset relation adjacent to another of said radial poles so as to effect in response to the deenergization of said winding a second discrete angular position of the magnet adjacent the first position with the one and other poles of the magnet being offset equally from both said one and said other respective radial poles; and the offset relation of the one and other poles of the magnet to the one and other of said respective radial poles in said lock position being effective for deflecting said magnet in an angular sense dependent upon the angular relation of the poles of the magnet to the radial poles of the annular ferromagnetic core and to a position in substantial alignment with the magnetic field established by the stator in response to the selective energization of any one of said stator windings by the electrical signal.

References Cited
UNITED STATES PATENTS

| | | | |
|---|---|---|---|
| 1,464,103 | 8/1923 | Nash | 340—319 |
| 3,109,167 | 10/1963 | MacIntyre | 340—325 |
| 3,200,273 | 8/1965 | Lindt et al. | 310—43 X |
| 3,242,358 | 3/1966 | Balke et al. | 310—43 X |
| 3,260,871 | 7/1966 | Lang | 340—378 X |

NEIL C. READ, *Primary Examiner.*

I. J. LEVIN, A. J. KASPER, *Assistant Examiners.*